United States Patent
Huibers

(10) Patent No.: US 7,636,190 B2
(45) Date of Patent: Dec. 22, 2009

(54) METHOD OF PROJECTING AN IMAGE FROM A REFLECTIVE LIGHT VALVE

(75) Inventor: Andrew Huibers, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 187 days.

(21) Appl. No.: 11/418,968

(22) Filed: May 5, 2006

(65) Prior Publication Data

US 2006/0268389 A1      Nov. 30, 2006

Related U.S. Application Data

(60) Provisional application No. 60/678,617, filed on May 5, 2005.

(51) Int. Cl.
    *G02B 26/00*    (2006.01)

(52) U.S. Cl. .......................... 359/291; 359/290
(58) Field of Classification Search .................. 359/291
    See application file for complete search history.

(56) References Cited

U.S. PATENT DOCUMENTS

2003/0222980 A1* 12/2003 Miyagaki et al. ............ 348/115
2006/0268241 A1* 11/2006 Watson et al. .................. 353/94

* cited by examiner

*Primary Examiner*—Jordan M. Schwartz
*Assistant Examiner*—James C Jones
(74) *Attorney, Agent, or Firm*—Charles A. Brill; Wade James Brady, III; Frederick J. Telecky, Jr.

(57) ABSTRACT

Disclosed herein is a method of projecting images using reflective light valves. Pixel patterns generated of the light valve pixels based on image data are projected at different locations at a time such that the perceived resolution of the projected images can be higher than the total number of pixels in the light valve.

26 Claims, 9 Drawing Sheets

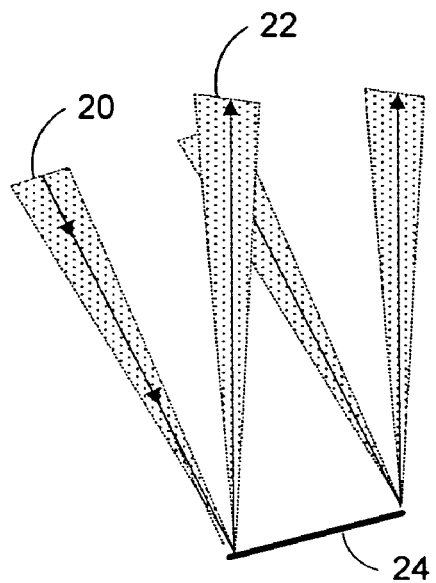
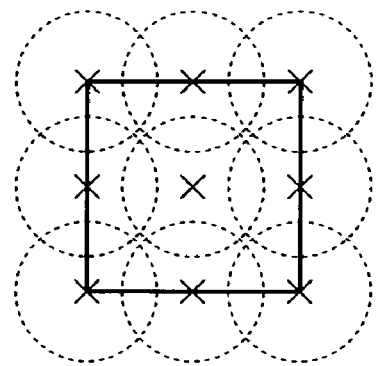
FIG. 1A    FIG. 1B
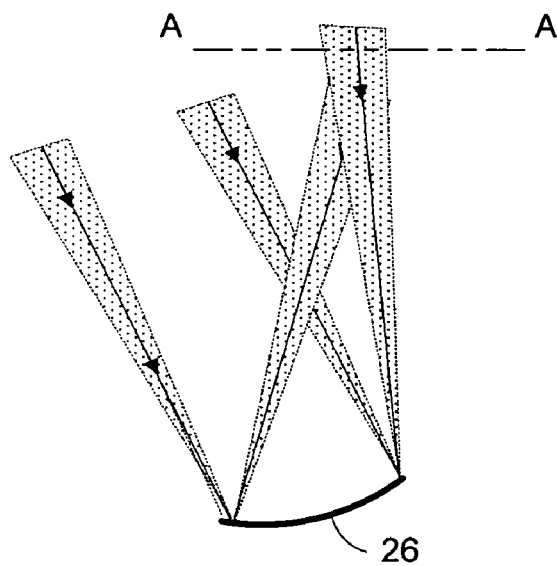
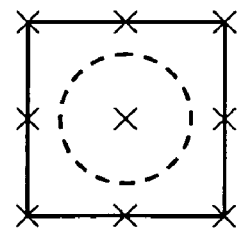
FIG. 1C    FIG. 1D

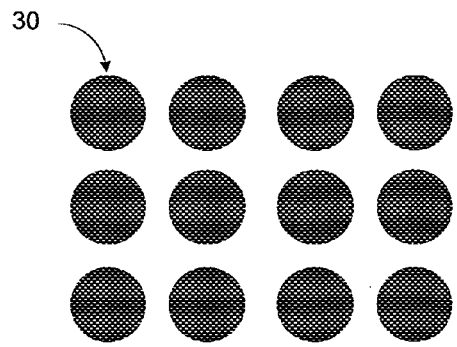
FIG. 6A
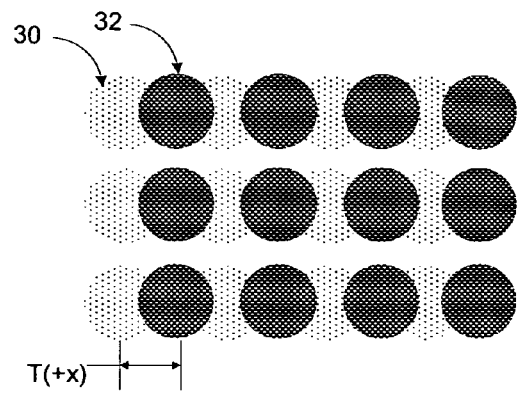
FIG. 6B
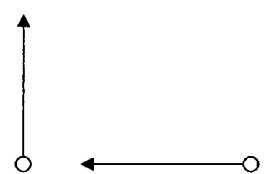
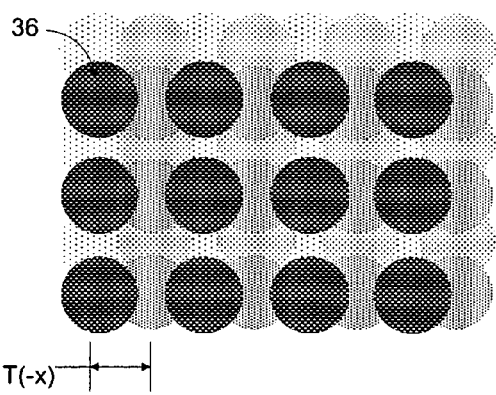
FIG. 6D
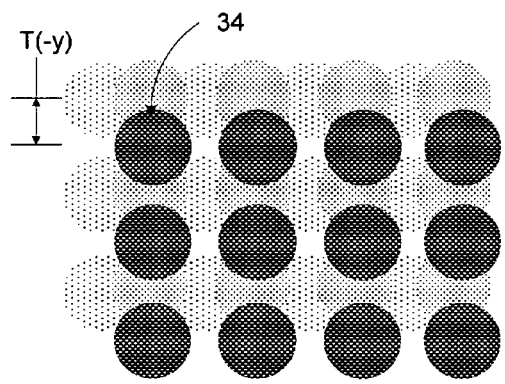
FIG. 6C

METHOD OF PROJECTING AN IMAGE FROM A REFLECTIVE LIGHT VALVE

CROSS-REFERENCE TO RELATED ARTS

This patent application claims priority under 35 U.S.C. 119(e) from co-pending U.S. provisional patent application Ser. No. 60/678,617 filed May 5, 2005, the subject of which is incorporated herein by reference in entirety.

The subject matter of each of the following patents and patent applications are incorporated herein by reference in their entirety.

| Ser. No./U.S. Pat. No. | Filling/Issue Date |
| --- | --- |
| 09/564,069 | May 3, 2000 |
| 10/340,162 | Jan. 10, 2003 |
| 10/407,061 | Apr. 2, 2003 |
| 10/607,687 | Jun. 23, 2003 |
| 10/648,608 | Aug. 25, 2003 |
| 10/648,689 | Aug. 25, 2003 |
| 10/698,290 | Oct. 30, 2003 |
| 10/751,145 | Jan. 2, 2004 |
| 10/865,993 | Jun. 11,2004 |
| 10/343,307 | Jan. 29, 2003 |
| 5,835,256 | Nov. 10, 2003 |
| 09/767,632 | Jan. 22, 2001 |
| 10/437,776 | May 13, 2003 |
| 10/698,563 | Oct. 30, 2003 |
| 10/857,132 | May 28, 2004 |
| 10/857,514 | May 28,2004 |
| 10/982,259 | Nov. 5, 2004 |

TECHNICAL FIELD OF THE INVENTION

The present invention is generally related to the art of projection systems, and more particularly, to method of projecting images from reflective light valves having individually addressable pixels.

BACKGROUND OF THE INVENTION

Projection systems employing reflective light valves produce images by modulating light beams with individually addressable pixels of the reflective light valves. The number of addressable pixels in a reflective light valve predominately determines the resolution of the projected images. Specifically, the more addressable pixels a light valve has, higher resolution the projected images can be. However, the number of addressable pixels in a single light valve is subject to many limitations in both manufacturing and factors from other components of the light valve. Increasing the image resolution by enlarging the number of addressable pixels increases the cost and complexity of the pixels in the light valve.

Therefore, what is needed is a method of projecting images of higher perceived resolutions from a light reflective valve with less addressable pixels.

SUMMARY OF THE INVENTION

In view of foregoing, a method of projecting an image using a reflective light valve is provided. The projection image has a perceived resolution higher than the number of addressable pixels in the light valve. The projection is performed by scanning the image area in a display target with the modulated light beams from an array of addressable pixels. The scanning speed is above a threshold such that the viewer's eyes meld two or more image pixels in the image area generated from each addressable pixel can perceive as a higher resolution.

In one example, each addressable pixel has a curved reflective deflectable surface. The curved reflective surface converges the light beams incident thereto at a plane above the curved surface, resulting in the image of the curved surface being smaller than the physical size of the reflective surface.

In an exemplary projection, a light from a light source is directed onto a reflective spatial light modulator. The pixels of the spatial light modulator are modulated such that the pixels in an ON state direct light as a first pixel pattern via projection optics onto a target. On a graph of intensity vs. distance across a row of projected pixels on the target at a particular time T1, FWHM, defined as the full width at half maximum of an intensity peak for a particular pixel, is between 30% and 70% of the pitch, defined as the distance between adjacent intensity peaks. The spatial light modulator can be a liquid crystal on silicon modulator or a micromirror array based spatial light modulator.

When the pixels of the reflective light valve are micromirror devices, the micromirror devices are preferably binary micromirrors operated by pulse width modulation. It is further preferred that each micromirror comprises a reflective deflectable mirror plate that is curved. For example, the curved reflecting surface has a surface normal that changes by at least 1 degree, or 2 degrees or more, or 3 degrees or more, or 4 degrees or more, or 5 degrees or more across the curved reflecting surface. Alternatively, the curved reflecting surfaces of the micromirrors can have a radius of curvature of less than 300, such as 150 or less, or 100 or less.

In scanning the image area in the display target with the pixels of the light valve, a first pattern is generated by the addressable pixels at a first time T1. Then a second pixel pattern is generated in the image area at another time T2, where the intensity peaks of the second pixel pattern do not correspond to the positions of the intensity peaks of the first pixel pattern. Instead, the intensity peaks of the second pixel pattern can be positioned approximately half way between adjacent intensity peaks of the first pixel pattern. More pixel patterns can be generated at following time periods with the generated pixel patterns having intensity peaks not coincident to any previous ones if desired. When such scanning speed is above a threshold, viewer's eyes meld the pixel patterns and perceive the image at a higher resolution than the number of addressable pixels of the light valve.

The objects and advantages of the present invention will be obvious, and in part appear hereafter and are accomplished by the present invention. Such objects of the invention are achieved in the features of the independent claims attached hereto. Preferred embodiments are characterized in the dependent claims.

BRIEF DESCRIPTION OF THE DRAWINGS

The accompanying drawings are illustrative and are not to scale. In addition, some elements are omitted from the drawings to more clearly illustrate the embodiments. While the appended claims set forth the features of the present invention with particularity, the invention, together with its objects and advantages, may be best understood from the following detailed description taken in conjunction with the accompanying drawings, in which:

FIG. 1A illustrates the illumination light beams reflected from a flat reflecting surface;

FIG. 1B illustrates a top view of the reflective surface in FIG. 1A with the profile of the reflected light beams therefrom;

FIG. 1C illustrates the illumination light beams reflected from a curved reflecting surface;

FIG. 1D illustrates a top view of the reflective surface in FIG. 1C with the profile of the reflected light beams therefrom;

FIG. 6A to FIG. 6D demonstratively illustrates an exemplary projection method according to an embodiment of the invention;

DETAILED DESCRIPTION OF THE DRAWINGS

The present invention will be discussed in the following with reference to examples wherein the reflective valve comprises an array of deflectable reflective micromirrors. However, it will be understood that the following discussion is for demonstration purposes, and should not be interpreted as a limitation. Instead, any variations without departing from the spirit of the invention are applicable. For example, the invention is also applicable to other type of reflective light valves, such as liquid crystal on silicon projection systems.

Turning to the drawings, FIG. 1 illustrates reflection of a light beam from a flat reflective mirror plate. Collimated incident light beams 20 are reflected by mirror plate 24 having a flat (non-curved) reflecting surface. Each of the reflected light beams extend spatially as it propagates. The overall profile of the reflected light beam in a plane parallel to and above the mirror plate is extended, as shown in FIG. 1B, wherein the cross-section of each reflected beam intersected by the plane is illustrated with dash-line circles. As a result, the image of the mirror plate generated from the over all profile of the reflected light beams is larger than the physical size of the mirror plate. Because the overall profile is larger than the physical size of the mirror plate, the illumination intensity of the image pixel corresponds to the mirror plate may be reduced, as well as the contrast ratio.

The reduction in illumination intensity problem in FIG. 1A and FIG. 1B can be solved by using a curved mirror plate, as shown in FIG. 1C and FIG. 1D. Referring to FIG. 1C, the same incident light beams (e.g. the same intensity, angular distribution, incident angle, and solid angle of the cone of the light beam) can be reflected such that the reflected beams converge spatially. At a plane, such as plane AA, parallel to and above the mirror plate, the converged reflected light beams overlapped, and the overlap area is minimized. The minimized overlap is the image of the curved mirror plate (that is refereed to as "imaginary mirror plate"). Because such imaginary mirror plate is produced from the converging reflected light beams, the size of the imaginary mirror plate is smaller than the real physical size of the mirror plate, as shown in the dash-line circle in FIG. 1D. In another word, the radiation energy of the reflected light at plane AA is constrained within the imaginary mirror plate. As compared with that in FIG. 1A and 1B wherein the mirror plate is flat, the image pixel corresponds to the curved mirror plate has a higher illumination intensity and capability of higher contrast ratio.

Figure 2:
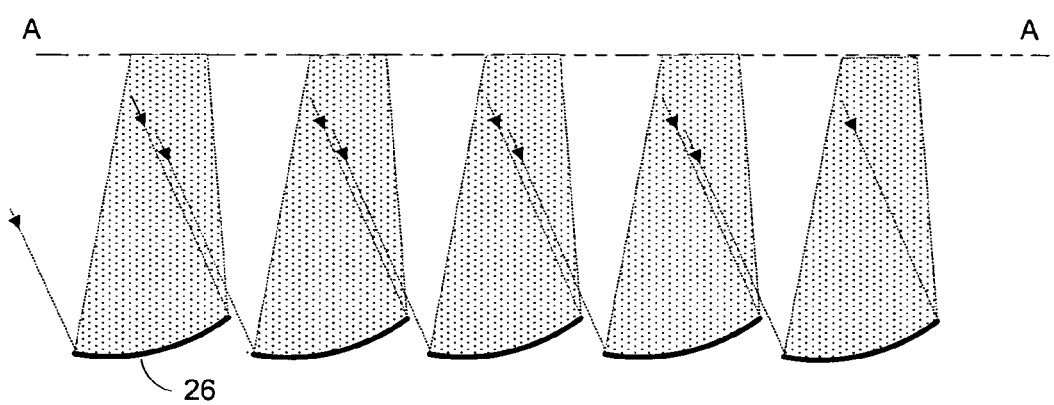
FIG. 2 illustrates an array of curved reflective surfaces in reflecting incident light beams at an ON state.

FIG. 2 illustrates an array of micromirrors in FIG. 1C at an ON state wherein the reflected incident light beams are reflected to the display target. Another state—the OFF state is defined as a state wherein the reflected light beams from the mirror plates are reflected away from the display target. At plane AA that is above and parallel to the mirror plates, the reflected incident light beams converge, resulting in an array of imaginary mirror plates, as shown in FIG. 3.

Figure 3:
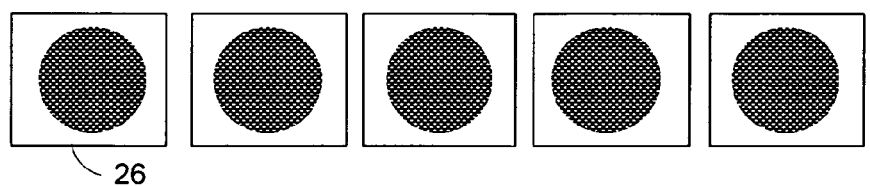
FIG. 3 illustrates the images of the curved reflective surfaces generated by the converged light beams.

Referring to FIG. 3, shaded circles represent the imaginary mirror plates each having a smaller area than the area of the real physical mirror plates that are shown as the squares. In this particular example, the mirrors are curved such that the curved reflective surfaces are parabolic or the like. Alternatively, the mirror plates can be curved along one or more directions, which results in different curved reflective surfaces. When the reflective mirror plates are curved in a direction opposite to the propagation direction of the reflected light, the imaginary mirror plates are smaller than the physical mirror plates and locate at plane AA that is between the mirror plates and the projected images. Alternatively, the mirror plates can be curved in the direction along the propagation path of the reflected light, in which instance, the imaginary mirror plates are larger than the areas of the physical mirror plates. These larger imaginary mirror plates are located at the opposite side of the mirror plates relative to the projected images, which is not shown in the drawing.

For demonstration purposes, only 5 (five) micromirrors of the micromirror array are show in FIG. 2 and FIG. 3. In general, the micromirror array may comprise any suitable number of reflective deflectable micromirrors, such as 512× 384 or higher, 960×540 or higher, 1024×768 or higher, and 1920×1080. The aspect ratio (the ratio of the number of rows to number of columns in the array) can be standard 4:3 or 16:9 or any desired numbers. The micromirror array can then be used to produce an image with a perceived resolution higher than the real resolution (the total number of micromirrors in the reflective light valve) in a projection system. An exemplary projection system is illustrated in FIG. 4.

Figure 4:
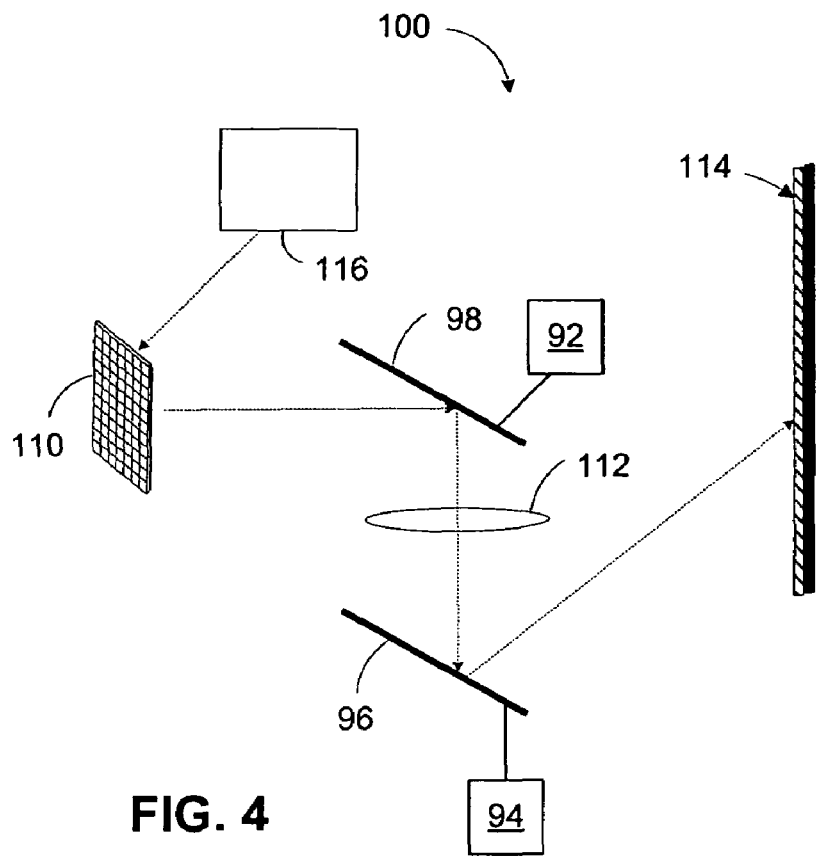
FIG. 4 illustrates an exemplary projection system according to an embodiment of the invention.

Referring to FIG. 4, display system 100 comprises illumination system 116 providing light beams to illuminate light valve 110. Light valve 110 comprises an array of reflective deflectable pixels, such as liquid crystal on silicon cells and micromirrors. The micromirrors can be the micromirrors having flat mirror plates (as shown in FIG. 1A) or curved mirror plates (as shown in FIG. 1C), but preferably the curved mirror plates. The pixels of the light valve modulate the incident light beams according to image data (such as bitplane data) that are derived from the desired images and video signals. The modulated light beams are then reflected by mirror 98 that reflects the modulated light beams to another mirror 96 through projection lens 112. The light beams reflected from mirror 96 are then projected to display target 114 so as to generate a pixel pattern.

Figure 5:
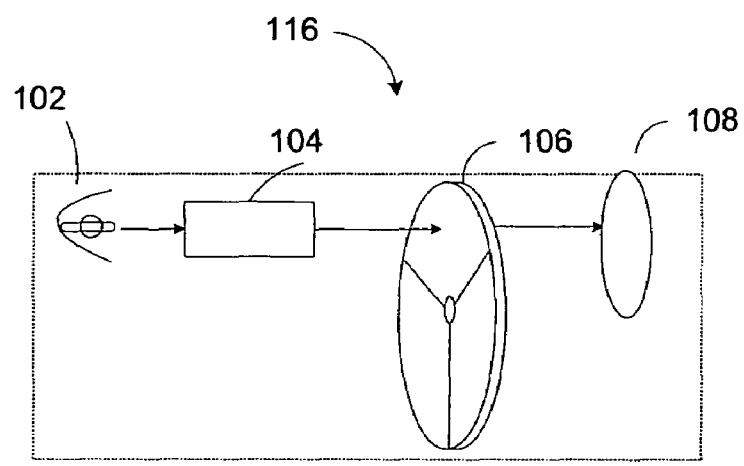
FIG. 5 illustrates an exemplary illumination system of the projection system in FIG. 4.

An exemplary illumination system 116 is illustrated in FIG. 5. Referring to FIG. 5, the illumination system comprises light source 102, light pipe 104, color wheel 106, and condensing lens 108. The light source can be an arc lamp with an elliptical reflector. The arc lamp may also be the arc lamps with retro-reflectors, such as Philips BAMI arc lamps. Alternatively, the arc lamp can be arc lamps using Wavien reflector systems each having a double parabola. The light source can also be a LED.

The color wheel comprises a set of color segments, such as red, green, and yellow, or cyan, yellow and magenta. A white or clear or other color segments can also be provided for the color wheel. In the operation, the color wheel spins such that the color segments sequentially pass through the illumination light from the light source and generates sequential colors to be illuminated on the light valve. For example, the color wheel can be rotated at a speed of at least 4 times the frame rate of the image data sent to the spatial light modulator. The color wheel can also be rotated at a speed of 240 Hz or more, such as 300 Hz or more.

The lightpipe is provided for delivering the light from the light source to the color wheel and, also for adjusting the angular distributions of the illumination light from the light source as appropriate. As an alternative feature, an array of fly's eye lenses can be provided to alter the cross section of the light from the light source.

Condensing lens 108 may have a different f-number than the f-number of projection lens 112 in FIG. 4. In this particular example, the color wheel is positioned after the light pipe along the propagation path of the light beams. In another embodiment, the color wheel can be positioned between the lightpipe and light source, which is not shown in the figure.

According to the embodiment of the invention, mirror 98 or mirror 96 or both are movable. For example, mirror 98 can be rotated in the plane of the paper along a rotation axis that points out from the paper. Such rotation can be driven accomplished by a micro-actuator 92 (e.g. a piezo-actuator) connected to mirror 98. Similarly, mirror plate 96, if necessary, can be connected to micro-actuator 94 for rotating mirror 96.

By rotating mirror 98 or mirror 96, the pixel patterns generated by the pixels of the light valve according to the image data can be moved spatially across the image area (the area where the desired images and videos are projected) in the display target so as to obtain the projected images and videos with a higher resolution than the real physical resolution (the number of physical pixels in the light valve) of the light valve. As a way of example, FIG. 6a to FIG. 6D demonstratively illustrates a projection method according to an embodiment of the invention.

Referring to FIG. 6A, an array of pixel pattern generated by an array of addressable pixels in the light valve is illustrated. For simplicity purposes, only 4×3 pixels in the array are illustrated. At time $T_1$, pixel pattern 30 is at the first location in the display target. Each pixel in the pixel pattern corresponds to an image pixel of the image to be produced. At time $T_2$, second pixel pattern 32 is generated and is projected at the second location in the display target, as shown in FIG. 6B.

Referring to FIG. 6B, the first pixel pattern at the previous time interval $T_1$ is illustrated with light-shaded circles, and the second pixel pattern is illustrated with dark shaded circles. The first and second pixel patterns are offset along the positive x direction (+x), and the offset distance between the first and second locations of the first and second pixel patterns on the display target is represented by T(+x). It can be seen in the figure that the pixels of the second pixel pattern are located between two adjacent pixels of the first pixel pattern such that the pixels of the first and second pixel patterns alternate along the pixel rows. When the moving speed of the pixel pattern from the first to the second is above a threshold, viewer's eyes meld the first and second pixel pattern and perceive the image with a resolution including the first and second pixel patterns, such as 8×6. It is further preferred that the pixels of the first and second pixel patterns are overlapped as shown in the figure, such that image edges can be smeared, and the blank areas between the individual first and second pixels patterns can be filled with one another.

As an aspect of the embodiment of the invention, the first and second pixel patterns are overlapped such that, on a graph of intensity vs. distance across a row of projected pixels on the target at a particular time T1, FWHM, defined as the full width at half maximum of an intensity peak for a particular pixel, is 70% or less, preferably 60% or less of the pitch, defined as the distance between adjacent intensity peaks. Alternatively, the intensity peaks of the second pixel pattern can be positioned approximately half way between adjacent intensity peaks of the first pixel pattern. In another example, the intensity profile of the second pixel pattern may have an overlap of 45% or less with the intensity profile of the first pixel pattern, wherein the overlap is the two dimensional intensity integral between a first pixel of the first pixel pattern and a second pixel of the second pixel pattern. The intensity profile of the second pixel pattern may have an overlap of from 5% to 45%, or 10% to 30%.

After time $T_1$ during which the second pixel pattern is generated and projected on the display target, a third pixel pattern can then be generated and projected on the display target, as shown in FIG. 6C. Referring to FIG. 6C, the first and second pixel patterns at $T_1$ and $T_2$ are illustrated with light-shaded circles, while the third pixel pattern is shown with dark-shaded circles. The third pixel pattern is at a location offset from the first and second positions. Specifically, the third pixel pattern is offset from the second pixel pattern along the negative (−y) direction of the pixel array. The offset is represented by T(−y). According to the invention, the third pixel pattern fills the blanks cornered with the four adjacent pixels of the first pixel pattern. The third pixel pattern is preferably overlapped with the first and second pixel patterns. Specifically, the third pixel pattern can be overlapped in the same way as the second pixel pattern overlaps with the first pixel pattern.

After time $T_3$ during which the third pixel pattern is generate and projected on the display target at location 34 as shown in FIG. 6C, the fourth pixel pattern can be generated and projected on the display target, as shown in FIG. 6D.

Referring to FIG. 6D, the fourth pixel pattern is projected at location 36 on the display target at time $T_4$. The location 36 is offset from the locations of the first, second, and third pixel patterns. Specifically, the fourth pixel pattern can be at la location that is offset from the third pixel along the negative x (−x) direction, with the offset being represented by T(−x), as shown in the figure. The fourth pixel pattern is preferably overlapped with the first, second, and third pixel patterns in the same way as the third pixel pattern overlaps with the second and first pixel pattern.

After time $T_4$, a new projection cycle can be started. In the above exemplary projection cycle discussed with reference to FIG. 6A to FIG. 6D, the total amount of time $(T_1+T_2+T_3+T_4)$ of the first, second, third and fourth pixels patterns is desired to be less than a threshold such that the viewer's eyes can not detect the transition of the four pixel patterns. Instead, the viewer's eyes meld the four pixel patterns at different locations, and perceive the image with a resolution equivalent to the summation of the resolutions of the four pixel patterns. It is worthwhile to point out that the pixel patterns are generated according to the image date (e.g. bitplane data) derived from the image or videos. The pixel data are generally different from each other, but of course can be the same, depending upon the image or video to be projected.

Figure 7A:
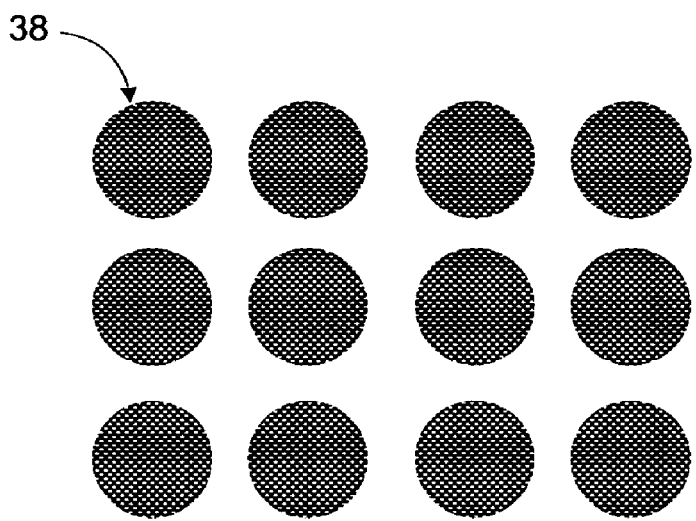
FIG. 7A and FIG. 7B demonstratively illustrates another exemplary projection method according to another embodiment of the invention.
Figure 7B:
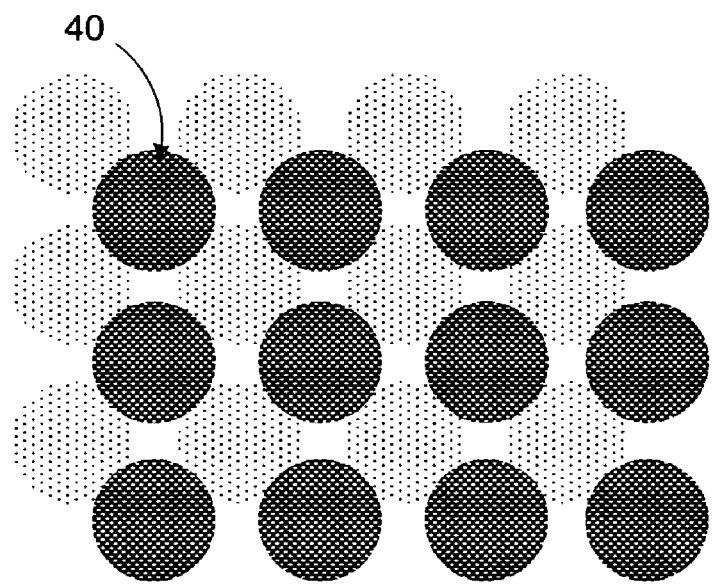

FIG. 7A and FIG. 7D illustrate another exemplary projection method according to another embodiment of the invention. Referring to FIG. 7A, the first pixel pattern is generated and projected on the display target at location 38 during time $T_1$. For simplicity and demonstration purposes, only 4×3 pixels are illustrated. After time $T_1$ and during time $T_2$, the second pixel pattern is generated and projected at location 40 on the display target, as shown in FIG. 7B. Referring to FIG. 7B, the first pixel pattern is shown in light-shaded circles, while the second pixel pattern is illustrated with dark-shaded circles. The second pixel pattern is disposed such that the second pixel pattern is shifted along the diagonal of the first pixel pattern. Each pixel of the first pixel pattern is located substantially around the center of an area cornered by four pixels of the first pixel pattern. It is preferred that the second pixel pattern overlaps with the first pixel pattern. The overlap may or may not be the same as the overlap between the third pixel pattern and the first pixel pattern as discussed with reference to FIG. 6C.

Figure 8A:
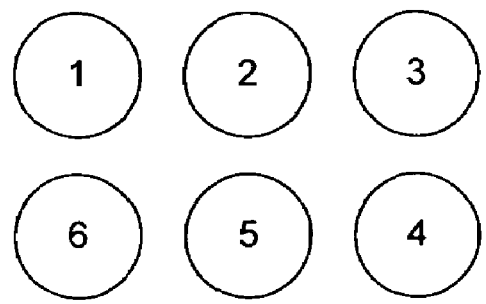
FIG. 8A demonstratively illustrates yet another exemplary projection method according to an embodiment of the invention.

Alternatively to the projection methods discussed above, other projection methods are also applicable. As shown in FIG. 8A, the projection can be performed by repeating a projection cycle. The projection cycle comprises: generating a first pixel pattern according to the image data and projecting the first pixel pattern at the first location (represented by the circle marked with 1) on the display target during time $T_1$. After time $T_1$ and during time $T_2$, a second pixel pattern is generated according to the image data and projected at the second location (represented by the circle marked with 2) on the display target during time $T_2$. After time $T_2$ and during time $T_3$, a third pixel pattern is generated according to the image data and projected at the third location (represented by the circle marked with 3) on the display target during time $T_3$. At time $T_4$, a fourth pixel pattern is generated and projected at the fourth location (represented by the circle marked with 4) that is immediately following the third location in the previous row. This minimizes the distance thus the time between the third and fourth locations. After $T_4$, the fifth and sixth pixel patterns are sequentially and consecutively generated and projected at the fifth and sixth locations, respectively.

Figure 8B:
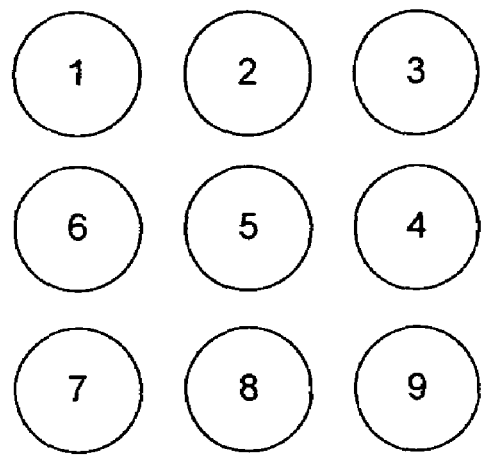
FIG. 8B demonstratively illustrates yet another exemplary projection method according to an embodiment of the invention.

Another exemplary projection method is illustrated in FIG. 8B. Referring to FIG. 8B, nine pixel patterns are generated and sequentially projected at the locations from the first to the ninth. To avoid large jump between two locations, the locations are arranged such that the fourth location is immediately underneath the previous third location; and the seven location is immediately underneath the sixth location. Specifically, the cycle comprises projection of the pixel patterns in locations that are arranged in both positive (e.g. from left to right) and negative locations (e.g. from right to left). After the projection at the ninth location, the immediate following pixel pattern is projected at location marked as 8. The following pixel patterns are consecutively projected at locations of 7, 6, 5, 4, 3, 2, and 1. Then the location sequence from 1 to 9 is repeated for the next following projection cycle.

Figure 8C:
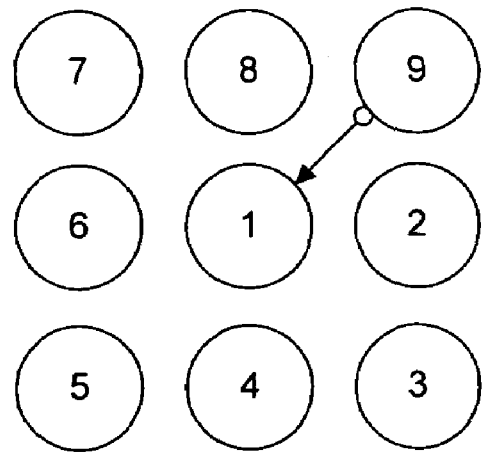
FIG. 8C demonstratively illustrates yet another exemplary projection method according to an embodiment of the invention.

Alternative to the projection method as illustrated in FIG. 8B, the projection cycle can be performed by projecting the pixel patterns at locations that are arranged recursively around a center, as shown in FIG. 8C. Referring to FIG. 8C, the projection cycle starts from projecting the first pixel pattern at the first location on the display target. The following pixel patterns are projected at locations from 2 to 9, as shown in the figure. After projection at location 9, the next pixel pattern is projected at the first location.

In the above discussion with reference to FIG. 8A to FIG. 8C, the embodiments of the invention are discussed with particular examples. In fact, other variations are applicable. For example, each projection cycle may comprise any suitable number of projections of appropriate number of pixel patterns at different locations on the display target. However, the arrangement of the projection locations and sequences of passing these locations can be of a wide range, as set forth in US patent applications US 20040027313 and US20050025388; and U.S. Pat. Nos. 6,317,169 and 5,402,184, the subject matter of each being incorporated herein by reference in their entirety.

In the above discussion, the micromirrors (the pixels of the pixel patterns) are arranged within a rectangle, and the mirror plates of the micromirrors are disposed such that the edges of the micromirrors are parallel to the edges of the micromirror array. In another embodiment of the invention, the micromirrors can be arranged in the array such that each micromirror is rotated 35° to 55° degrees along an axis passing through the center of the mirror plate and perpendicular to the mirror plate, as shown in FIG. 9.

Figure 9:
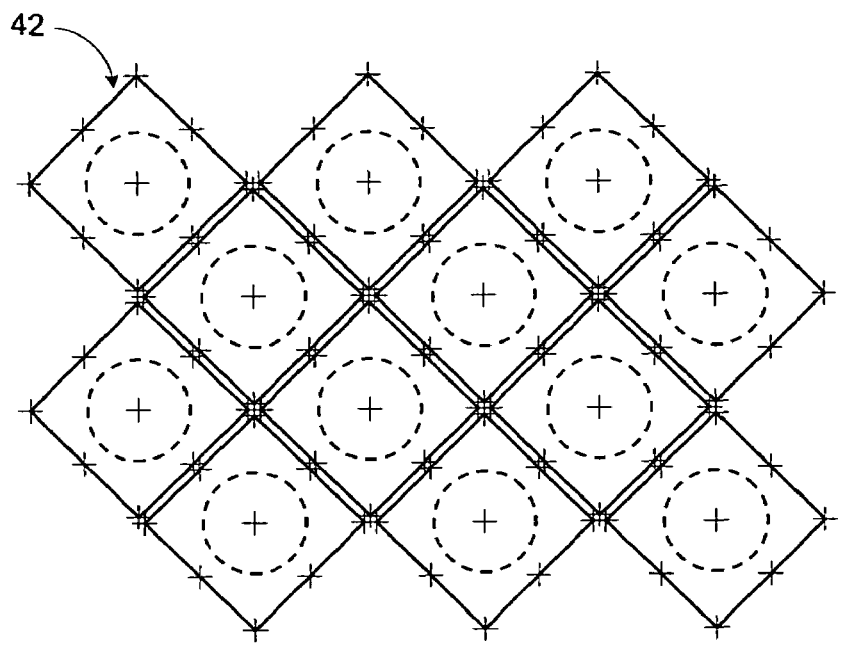
FIG. 9 demonstratively illustrates an array of micromirrors that are arranged with each micromirror being rotated at an angle.

Referring to FIG. 9, 12 micromirrors of the array are illustrated for simplicity and demonstration purposes. Because the micromirrors are rotated, none of the edges of the mirror plates of the micromirrors in the micromirror array are parallel to any edges of the micromirror array. The imaginary mirror plates of the curved micromirrors are illustrated by the dash-line circles. Of course, the mirror plates of the micromirrors may not be curved. An exemplary projection method of using the micromirrors in FIG. 9 is illustrated in FIG. 10.

Figure 10:
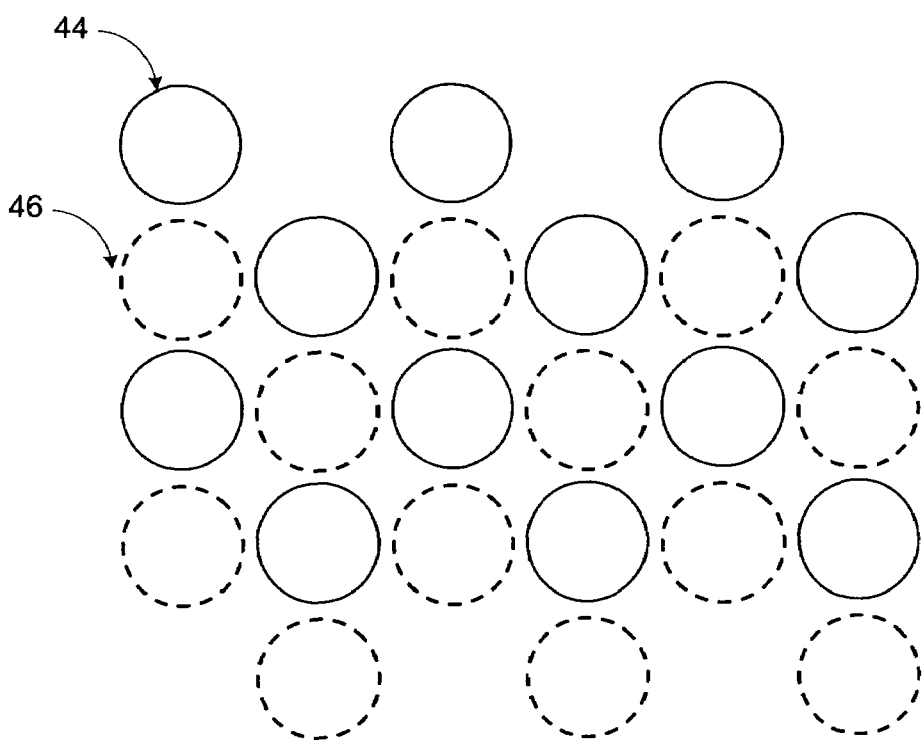
FIG. 10 illustrates an exemplary projection method using the micromirrors in FIG. 9.

Referring to FIG. 10, first pixel pattern is generated and projected at location 44 in the display target at time $T_1$, which is represented by the closed circles. After time $T_1$ and during time $T_2$, the second pixel pattern is generated and projected at location 46 other than location 44 in the display target. The first and second pixel patterns are located such that each pixels of the second (and first) pixel pattern is surrounded by four (or other number) of the pixels from the first (and the second) pixel pattern. Such projection cycle is repeated such that the perceived resolution of the projected image and/or video has a resolution higher than the number of pixels in each pixel pattern.

In addition to the projection methods as discussed above, the pixel patterns can be projected such that the pixel patterns continuously moves from one position to another. By "continuous" it is meant that the distance between the locations of two consecutive pixel patterns is less than two times of the distance between two adjacent pixels. Alternatively, the projection can be performed by projecting the pixel patterns in a way similar to the standard raster TV scanning method. Specifically, the pixel patterns are continuously projected along a row (e.g. from left to right) followed by a discontinuous jump, such as a jump from the right most location to the left most location in the next row.

The projection method of the present invention can be implemented in display systems each having one reflective light valve. Alternatively, the embodiments of the present invention can be implemented in display systems having multiple reflective light valves, such as that in FIG. 11.

Figure 11:
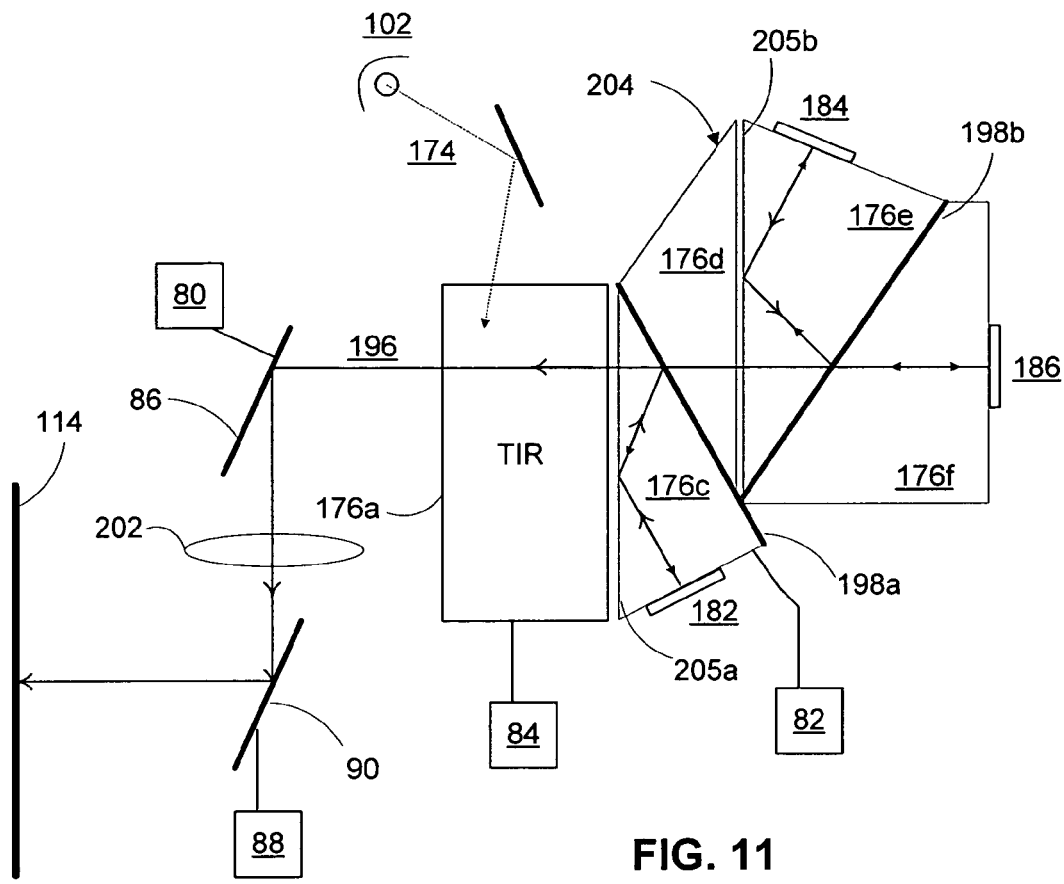
FIG. 11 illustrates another exemplary projection system according to an embodiment of the invention.

Referring to FIG. 11, the display system comprise uses a dichroic prism assembly 204 for splitting incident light into three primary color light beams. Dichroic prism assembly comprises TIR 176a, 176c, 176d, 176e and 176f. Totally-internally- reflection.(TIR) surfaces, i.e. TIR surfaces 205a and 205b, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green, and blue lights can be properly modulated. The modulated red, green, and blue lights are recollected and delivered onto display target 114 through optic elements, such as projection lens 202, if necessary.

In order to produce images and video signals with a higher perceived resolution than the total number of real physical pixels in each reflective light valve (184, 186, and 182), the combined light 196 is further manipulated through mirror 86, mirror 90, and projection lens 202, wherein one or both of mirrors 86 and 90 are rotatable along axes passing their centers and pointing out from the paper. The rotations of mirrors 86 and 90 are driven by micro-actuators 80 and 88 that are respectively connected to the mirrors.

In the operation, the combined light 196 is reflected from mirror 86 towards mirror 90 through projection lens 202. The combined light after mirror 90 is reflected to display target 114 so as to generate the desired images and/ or videos. By rotating mirror 86 or mirror 90, or both, the pixel patterns generated by the pixels of the light vales 182, 184, and 186 can be projected at different locations in the display target with the methods as discussed above with reference to FIG. 6A to FIG. 10. Alternative to rotating mirror 86 or mirror 90, TIR can be moved, such as vertically or horizontally or rotating within or out of the paper or any combinations thereof, by micro-actuator 84 connected thereto so as to projecting the combined light 196 at different locations. In another embodiment, projection of the combined light 196 at different locations on the display target can be accomplished by moving the triangular prism having the TIR surface of 205 and to which light valve 182 is attached. Such movement can be accomplished through micro-actuator 82 attached to the triangular prism.

Figure 12:
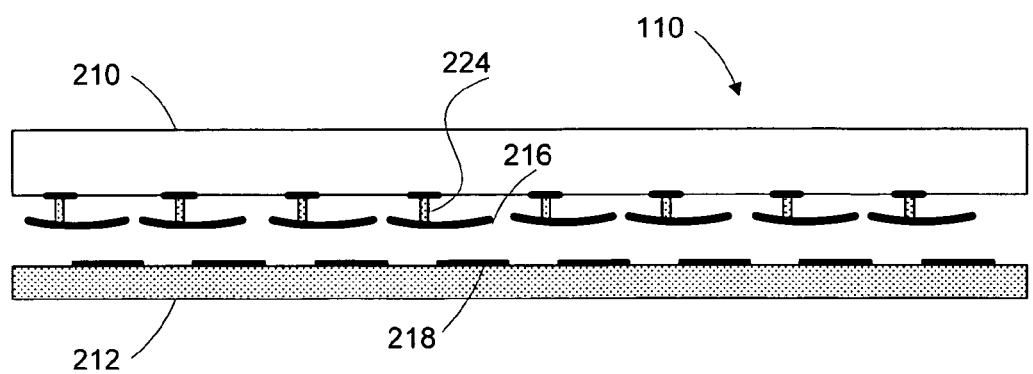
FIG. 12 is an cross-section view of an exemplary spatial light modulator having an array of reflective deflectable mirror pates each of which is curved.

The light valve in display systems as shown in FIGS. 4 and 11 can be of a variety of configurations, one of which is illustrated in a cross-sectional view in FIG. 12. Referring to FIG. 12, light valve 110 comprises an array of curved mirror plates formed between substrates 210 and 212, one of which is a semiconductor substrate on which standard integrated circuits can be fabricated. In this particular example, the mirror plates are formed on substrate 210 that is a light transmissive substrate, such as glass, quartz, and sapphire. Addressing electrodes 218 are fabricated on substrate 212 that is a semiconductor substrate for addressing and deflecting the mirror plates. The mirror plates can also be formed on the semiconductor substrate 212, in which instance, substrate 210 may not be necessary. In an embodiment of the invention, each mirror plate is associated with only one addressing electrode. Other alternative features can be applied. For example, a light transmissive electrode can be fabricated on the light transmissive substrate. The light transmissive substrate may have other optical coatings, such as an anti-reflection film. To avoid unwanted light scattering, a light blocking material can be provided. Such light blocking material can be coated around the circumference of the micromirror array, or around the individual micromirrors and/or addressing electrodes, or alternatively, o the exposed areas of the posts that are provided for supporting the mirror plates.

The mirror plate can be attached to a deformable hinge (e.g. a torsion hinge) that is supported by the posts. The mirror plate can be attached such that the mirror plate rotates symmetrically or asymmetrically around a rotation axis. Alternatively, the mirror plate may or may not be in the same plane as the deformable hinge, which will; not be discussed in detail herein.

The mirror plates of the micromirrors in the light valve are preferably curved. The curvature can be quantitatively characterized by the radius of curvature and/or the curvature-induced-displacement (CID), which is better illustrated in FIG. 13.

Figure 13:
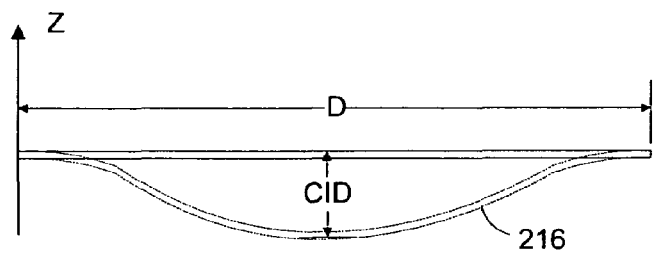
FIG. 13 and FIG. 14 schematically illustrate in a cross-section view a curved mirror plate.

Referring to FIG. 13, the CID is defined as the displacement of the center of the mirror plate from the non-curved position. The CID can be mathematically expressed as:

$$CID = \frac{1}{2}k \times \left(\frac{D}{2}\right)^2$$

wherein k is a constant, and D is the diameter of the mirror plate.

Figure 14:
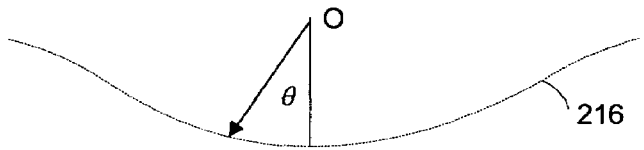

The curvature of the mirror plate can also be characterized by the changes of the surface normal, represented by angle θ in FIG. 14. According to the invention, the the curved reflecting surfaces of the micromirrors have a surface normal that changes across the curved reflecting surface by at least 1/12 of the maximum angle of deflection of the micromirrors, or at least 1/6 of the maximum angle of deflection of the micromirrors, or at least 1/3 of the maximum angle of deflection of the micromirrors. The curved reflecting surfaces of the micromirrors have a surface normal that changes by at least 2 degrees or more, or 3 to 6 degrees across the curved reflecting surface. The curved reflecting surfaces of the micromirrors have a radius of curvature of less than 20 times, or 10 times, or 7.5 times the micromirror pitch, where the micromirror pitch is defined as the center to center distance between adjacent micromirrors.

The curved mirror plate can be fabricated in many ways. For example, the mirror plate can be fabricated by two or more plate layers of different mechanical and/or thermal properties. Specifically, the multiple layers can be of different compression and tensile strains, as shown in FIG. 15.

Figure 15:
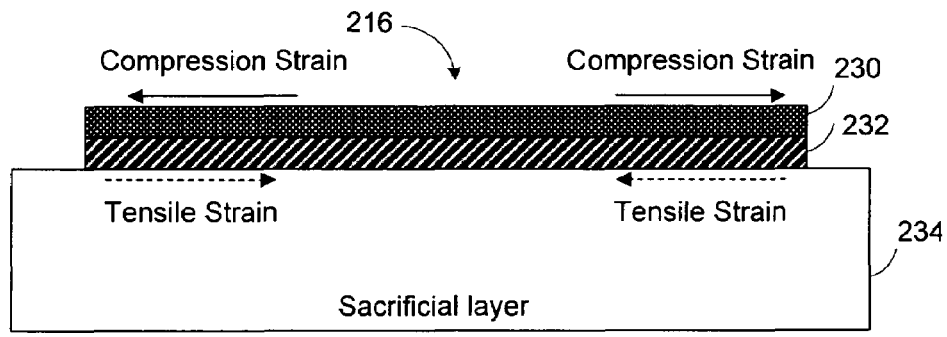
FIG. 15 schematically illustrates in a cross-section view a curved mirror plate in an exemplary fabrication process.

Referring to FIG. 15, mirror plate 216 may comprise layer 232 and layer 230. During a fabrication, layer 232, which has tensile strain, is deposited on sacrificial layer 234, such as amorphous silicon. Layer 230, which has a compression strain, is deposited on layer 232. When the sacrificial layer 234 is removed, the laminate of layers 230 and 232 is curved due to the compression and tensile strains.

Figure 16:
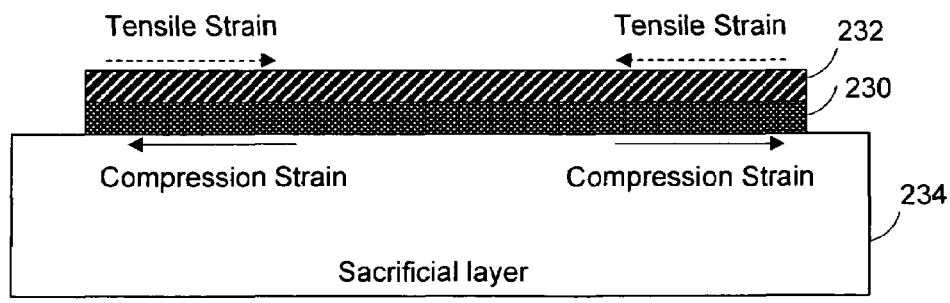
FIG. 16 schematically illustrates in a cross-section view a curved mirror plate in another exemplary fabrication process.

In another embodiment, the layer with compression strain can be deposited on the sacrificial layer, while the layer with the tensile strain is deposited on the layer having the compression strain, as shown in FIG. 16. After removing the sacrificial layer, the laminate of layers 232 and 230 is curved, but along the opposite direction along which the laminate in FIG. 15 is curved.

It will be appreciated by those skilled in the art that a new and useful method of projecting an image using a reflective light valve have been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention.

I claim:

1. A method for projecting an image from a micromirror array, comprising:
    directing light from a light source onto a micromirror array;
    modulating pixels of the micromirror array such that pixels in an ON state direct light as a first pixel pattern via projection optics onto a target;
    wherein the intensity vs. distance across a row of projected pixels on the target at a particular time T1, FWHM, defined as the full width at half maximum of an intensity peak for a particular pixel, is less than 70% of the pitch, wherein the pitch is defined as the distance between adjacent intensity peaks; and
    wherein the mirror plate comprise a curved reflecting surface; and wherein the curved reflecting surface has a surface normal that changes across the curved reflecting surface by at least 1/12 of the maximum angle of deflection of the mirror.

2. The method of claim 1, wherein the spatial light modulator is a liquid crystal on silicon modulator.

3. A method for projecting an image from a micromirror array, comprising:
    directing light from a light source onto a micromirror array;
    modulating pixels of the micromirror array such that pixels in an ON state direct light as a first pixel pattern via projection optics onto a target
    wherein the intensity vs. distance across a row of projected pixels on the target at a particular time T1, FWHM, defined as the full width at half maximum of an intensity peak for a particular pixel, is less than 70% of the pitch, wherein the pitch is defined as the distance between adjacent intensity peaks; and
    wherein the micromirrors are comprised of micromirror hinges and micromirror plates, wherein the micromirror plates comprise a first layer and a second layer, wherein the first layer has a different property than the second layer resulting in a curved mirror.

4. The method of claim 1, wherein the mirror plate comprises a curved reflecting surface; and wherein the curved reflecting surface has surface normal that changes across the curved reflecting surface by at least 1/3 of the maximum angle of deflection of the mirror.

5. The method of claim 1, wherein the mirror plate comprises a curved reflecting- surface: and wherein the curved reflecting surface has surface normal that changes by at least 2 degrees across the curved reflecting surface.

6. The method of claim 1, wherein the mirror plate comprises a curved reflecting- surface; and wherein the curved reflecting surface has surface normal that changes from 3 to 6 degrees across the curved reflecting surface.

7. The method of claim 1, wherein the mirror plate comprises a curved reflecting surface; and wherein the curved reflecting surface has a radius of curvature of less than 20 times the micromirror pitch, where the micromirror pitch is defined as the center to center distance between adjacent micromirrors.

8. The method of claim 1, wherein the mirror plate comprises a curved reflecting surface; and wherein the curved reflecting surface has radius of curvature of less than 7.5 times the micromirror pitch, where the micromirror pitch is defined as the center to center distance between adjacent micromirrors.

9. A method for projecting an image from a reflective spatial light modulator, comprising:
    directing light from a light source onto a reflective spatial light modulator;
    modulating pixels of the spatial light modulator such that pixels in an ON state direct light as a first pixel pattern via projection optics onto a target;
    wherein the intensity vs. distance across a row of projected pixels on the target at a particular time T1, FWHM, defined as the full width at half maximum of an intensity peak for a particular pixel, is less than 70% of the pitch, wherein the pitch is defined as the distance between adjacent intensity peaks; and
    further comprising directing light as a second pixel pattern at a time T2 where the intensity peaks of the second pixel pattern do not correspond to the positions of the intensity peaks of the first pixel pattern.

10. The method of claim 1, wherein the light source is an LED light source.

11. The method of claim 9, wherein the light is stepped from the first pixel pattern to the second pixel pattern.

12. The method of claim 9, wherein the light is moved continuously from the first pixel pattern to the second pixel pattern.

13. The method of claim 1, wherein the micromirrors are connected at each micromirror location to a silicon substrate having circuitry and electrodes for electrostatically actuating the micromirrors.

14. The method of claim 1, wherein an array of fly's eye lenses are provided to alter the cross section of the light from the light source.

15. The method of claim 1, wherein the micromirrors are disposed within a rectangular array of micromirrors, and wherein the micromirrors are substantially square mirrors and are disposed in a square lattice and have mirror edges that are parallel to edges of the rectangular array; and wherein the array comprises about 512 by about 384 micromirrors that form an about 1024 by about 768 resolution image on the target.

16. The method of claim 1, wherein the micromirrors are disposed within a rectangular array of micromirrors, and wherein the micromirrors are substantially square mirrors and are disposed in a square lattice and have mirror edges that are parallel to edges of the rectangular array; and wherein the array comprises about 960 by about 540 micromirrors that form an about 1920 by about 1080 resolution image on the target.

17. The method of claim 9, wherein the micromirrors are disposed within a rectangular array of micromirrors and where the micromirrors are substantially square mirrors disposed in a diagonal lattice and have mirror edges that are at an angle of from 35 to 55 degrees relative to the edges of the rectangular array; and wherein the array comprises about 1024 by about 768 micromirrors that form an about 1024 by about 768 resolution image on the target.

18. The method of claim 1, wherein the target is a screen portion of a rear projection television.

19. The method of claim 3, wherein the mirror plate comprise a curved reflecting surface; and wherein the curved reflecting surface has a surface normal that changes across the curved reflecting surface by at least $1/12$ of the maximum angle of deflection of the mirror.

20. The method of claim 3, wherein the first layer of the micromirror plate has a different strain than the second layer.

21. The method of claim 3, wherein the first layer of the micromirror plate has a different stress than the second layer.

22. The method of claim 3, wherein the first and second layers are made of the same material but formed with different properties.

23. The method of claim 3, wherein the first layer of the micromirror plate comprises a different material than the second layer.

24. The method of claim 9, wherein the intensity profile of the second pixel pattern on the target has an overlap of 45% or less with the intensity profile of the first pixel pattern, wherein the overlap is the two dimensional intensity integral between a first pixel of the first pixel pattern and a second pixel of the second pixel pattern.

25. The method of claim 9, wherein the intensity profile of the second pixel pattern on the target has an overlap of from 10 to 30%.

26. The method of claim 1, wherein the light source comprises a laser.

* * * * *